R. M. SPENCER.
SPRING TIRE.
APPLICATION FILED FEB. 15, 1909.
940,904.
Patented Nov. 23, 1909.
2 SHEETS—SHEET 1.
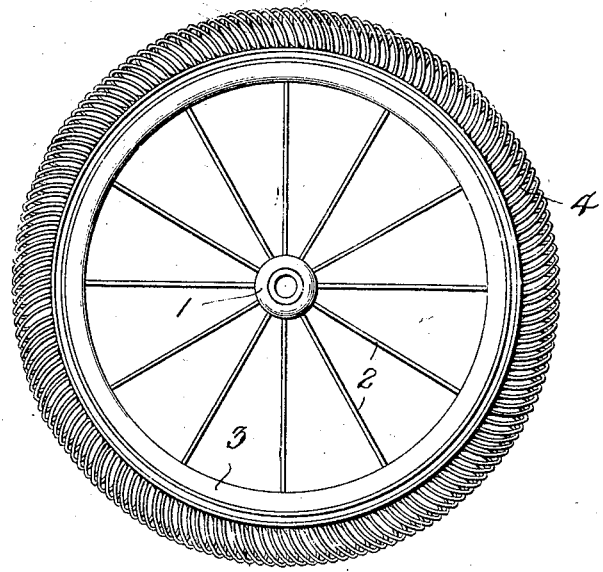
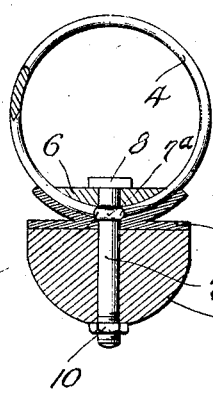
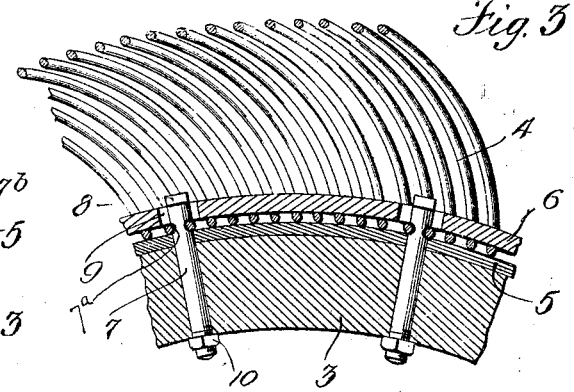
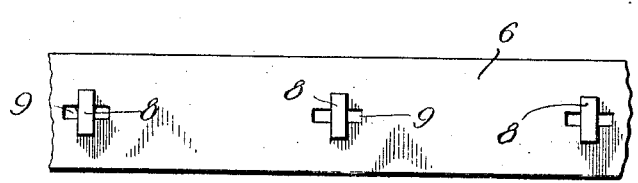
Witnesses
Jas. E. Dodge
S. E. Dodge
Inventor
R. M. Spencer
By Beeler & Robb
Attorneys R. M. SPENCER.
SPRING TIRE.
APPLICATION FILED FEB. 15, 1909.
940,904.
Patented Nov. 23, 1909.
2 SHEETS—SHEET 2.
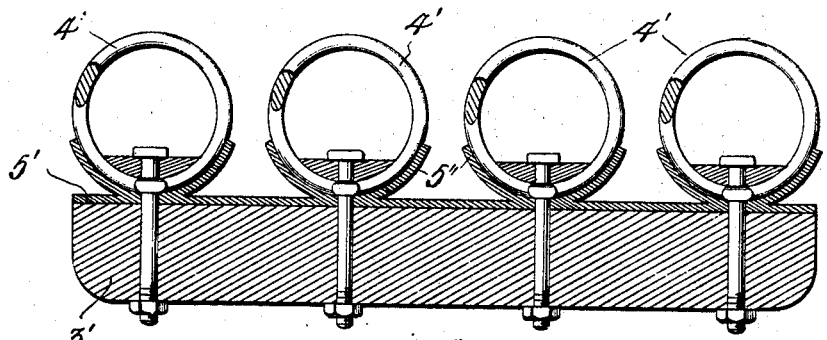
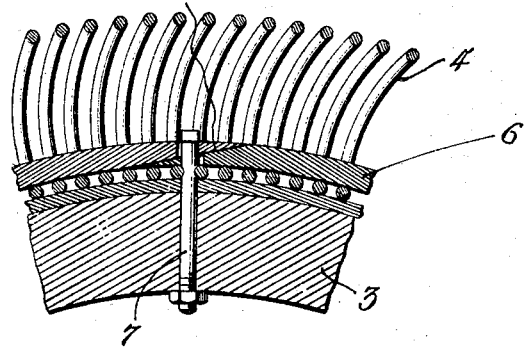
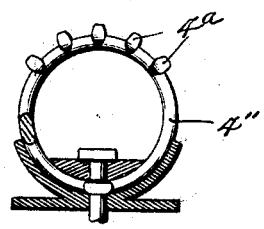
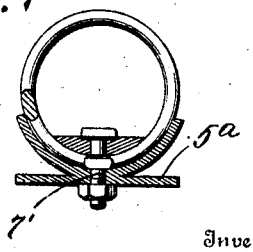
Witnesses
H. M. Brooks.
S. E. Dodge.
Inventor
R. M. Spencer
By Deelen & Cobb
Attorneys

UNITED STATES PATENT OFFICE.

RAPHAEL M. SPENCER, OF EDWALL, WASHINGTON.

SPRING-TIRE.

940,904.

Specification of Letters Patent.   Patented Nov. 23, 1909.

Application filed February 15, 1909.   Serial No. 478,029.

*To all whom it may concern:*

Be it known that I, RAPHAEL M. SPENCER, a citizen of the United States, residing at Edwall, in the county of Lincoln and State of Washington, have invented certain new and useful Improvements in Spring-Tires, of which the following is a specification.

The object of this invention is to provide a novel form of resilient tire for vehicle wheels.

The invention relates to that type of devices for the above purposes, and which embody the use of a tire or tread for the wheel consisting of a coiled spring applied to the felly of the wheel.

For a full understanding of the invention, reference is to be had to the following detail description and to the accompanying drawings, in which—

Figure 1 is a side elevation of a wheel having a spring tire applied thereto in accordance with the invention; Fig. 2 is a transverse sectional view through the tire and felly showing the securing means more clearly; Fig. 3 is a fragmentary longitudinal view more clearly illustrating the parts shown in Fig. 2; Fig. 4 is a top plan view, partially broken away, showing the band which holds the tire in place on the felly, and the interlocking heads of the fastening means; Fig. 5 is a modified embodiment of the invention; Figs. 6 and 7 are further modifications, and Fig. 8 is a sectional view bringing out more clearly the manner of joining the ends of the securing band for the tire.

Throughout the following detail description and on the several figures of the drawings similar parts are referred to by like reference characters.

In carrying out the present invention it is contemplated to employ any general construction of wheel embodying the usual hub 1, spokes 2, and felly 3. The present invention relates primarily to the peculiar form of the resilient or spring tire or tread shown at 4 and the special means employed for fastening the same to the felly 3. As shown most clearly in Fig. 1 the tire 4 comprises a continuous coiled spring, the coils inclining in one direction and consisting of an endless piece of wire bent into proper shape by a forward coiling movement, so that the side portions of the coil of the tire 4 at one side of the wheel are in advance of the operative side portions.

In order to secure the tire 4 to the wheel, the felly 3 is provided with a channel iron 5 on its outer side and in the channel of this member the innermost portions of the coiled spring comprising the tire 4 are received or seated, being held in place by a band 6 which passes through the coils as shown most clearly in Figs. 2 and 3. Fastenings 7 secure the parts 4, 5, and 6 to the felly 3, and these fastenings are of peculiar formation. The fastenings 7 consist of bolts having locking heads 8 which are adapted to pass through longitudinal slots 9 in the band 6, and to be turned into positions transverse or at a right angle to said slots to thereby interlock effectively with the band 6 in order to connect the latter with the felly. A short distance below its head 8 each of the fastenings 7 is formed with grooves 7$^a$ at opposite sides thereof in which grooves the inner portions of coils of the tire 4 are adapted to be received. The grooves 7$^a$ permit the coils of the tire to lie in closer relation than were the bolts 7 not provided therewith. In forming the grooves 7$^a$ in the fastening means 7 said members are subjected to pressure from opposite sides and this action forms opposite shoulders 7$^b$ on the sides of the member opposite those having the grooves 7$^a$. The shoulders 7$^b$ are adapted to engage the upper side of the channel iron 5, and the lower side of the band 6 and in this manner the portions 7$^b$ constitute parts which space the band 6 from the channel iron, preventing the bolts 7 from connecting the tire 4 to the channel iron so that the coils of the tire adjacent the member 7 are held too tightly for free play in order to secure the proper resilient or cushioning qualities desired, the bolts 7 having nuts 10 secured upon the inner ends thereof.

A vehicle wheel supplied with a tire constructed in accordance with the foregoing invention is possessed of many advantages from the standpoint of resiliency and cushioning qualities, the tire 4 being especially adapted to obviate vibration or shock as the wheel turns and passes over smaller or larger obstacles.

It will of course be understood that the number and size of the coils of the tire 4 may be varied, as well as the spaces therebetween.

In Fig. 5 is illustrated a modification of the invention in which a rim 5′ formed with the various panel members 5″ and attached to a broad felly 3', is employed. A plurality of the spring tires 4' would be used in this construction which is designed for very large vehicle wheels. Any suitable number of the tires 4' could be utilized according to the desire of the user, the rim 5' being of course constructed accordingly.

Fig. 6 illustrates a modification in which the coils or elements of the tire 4 are provided with projections or calks 4ª, it being contemplated to provide these calks to increase traction, and they may be formed integral with the coils of the tire 4'', brazed on, or otherwise attached.

Fig. 7 shows an embodiment of the invention wherein the use of a felly is dispensed with, and the vehicle wheel may comprise spokes fastened directly to the channel iron 5ª, the fastening 7' being short since they do not have to pass through a felly.

In Fig. 8 is shown the preferred method of joining the ends of the band 6, said ends being overlapped as shown at 6ª and one of the fastenings 7 passing through slots in the overlapped ends of the band, as shown most clearly in the drawing.

Having thus described the invention, what is claimed as new is:

1. In combination with a vehicle wheel embodying a felly, a channel iron applied thereto, a tire seated on the channel iron and comprising a coiled body with the innermost portions of the coils thereof in contact with the channel iron, a band passing through the coils of the tire, fastenings connecting the band with the felly, and spacing means located between the band and the channel iron to prevent undue friction upon the coils of the tire.

2. In combination with a vehicle wheel embodying a felly a channel iron applied thereto, a tire consisting of a coiled body, the innermost portions of the coils of which are seated on the channel iron, a band passing through the coils of the tire and having openings at intervals therein, fastenings at intervals on the felly and provided with heads interlocking with the band and adapted to pass through its openings, said fastenings being formed with shoulders at predetermined distances from the heads and located between the band and the channel iron to space the latter parts and prevent undue friction upon the coils of the tire when the fastenings are secured to the felly.

3. In combination with a vehicle wheel embodying a felly, a channel iron secured thereto, a tire consisting of a coiled body, the innermost portions of the coils of which are seated in the channel of the channel iron, a band passing through the coils and also having elongated openings at intervals therein, fastening bolts passing through the felly and having heads to pass through the openings of the band and interlock with the latter, said bolts being formed with grooves at opposite sides and spaced from the heads to form seats for certain coils of the tire, and also having oppositely projecting shoulders between the band and channel iron to space these parts and prevent undue friction on the portions of the coils of the tire that are received between said band and channel iron.

In testimony whereof I affix my signature in presence of two witnesses.

RAPHAEL M. SPENCER.

Witnesses:
ROBERT HAYNES,
WARD JESSEPH.